US007400875B2

(12) United States Patent
Konno

(10) Patent No.: US 7,400,875 B2
(45) Date of Patent: Jul. 15, 2008

(54) HOLDER FOR A SMALL-SIZED ACOUSTIC ELEMENT, AND MOUNTING STRUCTURE FOR THE HOLDER

(75) Inventor: Hideaki Konno, Tokyo (JP)

(73) Assignee: Polymatech Co. Ltd., Tokyo (JP)

( * ) Notice: Subject to any disclaimer, the term of this patent is extended or adjusted under 35 U.S.C. 154(b) by 642 days.

(21) Appl. No.: 10/869,874

(22) Filed: Jun. 18, 2004

(65) Prior Publication Data

US 2005/0009580 A1 Jan. 13, 2005

(30) Foreign Application Priority Data

Jun. 19, 2003 (JP) ............................ 2003-174220

(51) Int. Cl.
*H04B 1/06* (2006.01)

(52) U.S. Cl. .................... 455/349; 455/344; 455/575.1; 381/388

(58) Field of Classification Search ................. 455/349, 455/344, 347, 422.1, 3.06, 575.1; 379/428.01; 381/388, 334, 337
See application file for complete search history.

(56) References Cited

U.S. PATENT DOCUMENTS 3,987,258 A * 10/1976 Tsutsui et al. ............... 381/334
6,028,947 A * 2/2000 Faraone et al. .............. 381/337
6,674,996 B1 * 1/2004 Weckstrom .............. 455/575.1
7,074,998 B2 * 7/2006 Hurwicz ...................... 84/454
2007/0025582 A1 * 2/2007 Rashish et al. .............. 381/388

FOREIGN PATENT DOCUMENTS

| | | | |
|---|---|---|---|
| EP | 1 075 126 | | 2/2001 |
| JP | 11-088990 | A1 | 3/1999 |
| JP | 2000-299146 | A1 | 10/2000 |
| JP | 2001-189981 | | 7/2001 |
| JP | 2001-333481 | A1 | 11/2001 |
| JP | 2003-009493 | | 1/2003 |
| JP | 1 296 535 | | 3/2003 |

OTHER PUBLICATIONS

European Search Report dated Jul. 18, 2006.
European Search Report dated Jul. 18, 2006.

* cited by examiner

*Primary Examiner*—Lana N. Le
(74) *Attorney, Agent, or Firm*—Rader, Fishman & Grauer PLLC

(57) ABSTRACT

A holder is for a small-sized acoustic element and a mounting structure for the same allowing mounting to a casing with a sound hole in a side surface thereof without involving a substantial increase in the thickness of a portable communication apparatus. The holder for a microphone has a cylindrical portion for holding the outer peripheral surface of a small-sized acoustic element. The cylindrical portion is equipped with an inwardly directed flange adapted to be engaged with a holed surface of the small-sized acoustic element and constructed of an annular rubber-like elastic member. Further, the cylindrical portion is provided with a groove-shaped sound hole whose one end is open in the inner peripheral surface of the inwardly directed flange and whose other end is open in the outer peripheral surface of the cylindrical portion, thus communicating with both the holed surface of the small-sized acoustic element and the sound hole formed in a side surface of the casing of the portable communication apparatus.

14 Claims, 6 Drawing Sheets

HOLDER FOR A SMALL-SIZED ACOUSTIC ELEMENT, AND MOUNTING STRUCTURE FOR THE HOLDER

BACKGROUND OF THE INVENTION

1. Field of the Invention

The present invention relates to a holder for holding a small-sized acoustic element, such as a receiver, a speaker, or a buzzer, contained in a portable communication apparatus, such as a mobile phone, a PHS, or a PDA with a communicating function, and to a mounting structure for the holder.

2. Description of the Related Art

FIG. 6 shows a conventional mobile phone 1 having a casing 4 composed of a front cover 2 and a rear cover 3, with the casing 4 having on its front surface 4*a* an input operation section with a plurality of pushbutton keytops 5 for input operation and a display screen 6 above the input operation section. Above the display screen 6, there is formed a sound hole 7 in the form of a through-hole for emitting sound outwards from a built-in receiver (not shown). Below the pushbutton keytops 5, there is formed above a microphone 8 as a built-in "small-sized acoustic element" a microphone hole 9 situated in the form of a through-hole adapted to introduce the voice of the user.

The microphone 8 has a substantially disc-like general configuration, and is, as shown in FIG. 7, accommodated in a microphone holder 10. The microphone holder 10 is accommodated in a holder mounting input operation section 2*b* formed as a recess in the back surface 2*a* of the front cover 2. In this mounting structure, the sound receiving surface 8*a* of the microphone 8 faces the back surface 2*a*, and the voice V transmitted through the microphone hole 9 reaches the sound receiving surface 8*a*, thereby achieving an enhancement in sensitivity in sound gathering. That is, the direction perpendicular to the sound receiving surface 8*a* is matched with the hole axis of the microphone hole 9 to thereby enhance sensitivity in sound gathering.

As shown in FIG. 8, the microphone holder 10 has a cylindrical portion 10*a* retaining the entire outer peripheral surface 8*b* of the microphone 8. The cylindrical portion 10*a* is closed at one end by a bottom portion 10*b*, which has four elastic connector portions 10*c* in the form of columnar protrusions protruding from both sides thereof. Formed in the elastic connector portions 10*c* are conduction paths (not shown) in which conductive powder, granules, or linear bodies are arranged in the thickness direction by a magnetic force, and the four electrodes 8*c* of the microphone 8 are electrically connected to corresponding board electrodes 11*a* of a printed circuit board 11 through these conduction paths. At the other end of the cylindrical portion 10*a*, there is formed an inwardly directed flange 10*d*, which retains the outer edge of the sound receiving surface 8*a* of the microphone 8 over the entire periphery thereof. In a complete mounted state shown in FIG. 7, the inwardly directed flange 10*d* is pressurized by the back surface 2*a* of the front cover 2, whereby the microphone 8 is pressurized downwardly as seen in the drawing, making the electrical contact of the electrode 8*c* of the microphone 8 with the board electrodes 11*a* through the conduction paths of the elastic connector portions 10*c* more reliable. A conventional example of the microphone holder 10 as described above and the mounting structure for the same is disclosed in JP 2001-333481 A (FIGS. 1(3) and 2(3)).

Incidentally, the entire length L of the above-described conventional mobile phone 1 is not always large enough to allow the microphone hole 9 to reach the mouth of the user while the sound hole 7 is being applied to the ear. That is, the length is relatively small, causing the microphone hole 9 to be situated at a position near the cheek or the chin of the user. As a result, the user may inadvertently clog the microphone hole 9 with his cheek or chin during conversation. To solve this problem, a design has been conceived in which a microphone hole 12 is formed not in the front surface 4*a* of the casing 4 but in the bottom surface 4*b* thereof as in this particular conventional example.

However, as shown in FIG. 9, when there is adopted a mounting structure in which the microphone hole 12 is formed in the bottom surface 4*b* and in which the hole axis of the microphone hole 8 is matched with the direction perpendicular to the sound receiving surface 8*a* of the microphone 8 to achieve higher sensitivity in sound gathering, the thickness t2 of this structure has to be substantially increased as compared with the thickness t1 of the mobile phone 1 shown in FIGS. 6 through 8. And, this problem is experienced not only in the mobile phone 1 as shown, but also in various portable communication apparatuses, such as a collapsible mobile phone, a PHS, a transceiver in which the microphone hole is provided not in the front surface of the casing but in one of the side surfaces connected to the front surface. Further, this applies not only to the mounting structure for the microphone but also to the mounting structure for various small-sized acoustic elements, such as a receiver and a buzzer.

SUMMARY OF THE INVENTION

The present invention has been made in view of the above problem in the prior art. It is an object of the present invention to provide a holder for a small-sized acoustic element and a mounting structure therefor which allow mounting to a casing that has a sound hole in a side surface thereof without involving a substantial increase in the thickness of a portable communication apparatus.

In order to achieve the above mentioned object, according to the present invention, there is provided a holder for a small-sized acoustic element, which holds the small-sized acoustic element inside a casing of a portable communication apparatus, with a holed surface of the small-sized acoustic element for introducing or emitting sound being opposed to a back side of a front surface or a rear surface of the casing of the portable communication apparatus, the portable communication apparatus having at least one of an input operation section and a display screen in the front surface and having a side-surface sound hole in a side surface adjacent to the front surface, the holder for the small-sized acoustic element including:

- a cylindrical portion for holding an outer peripheral surface of the small-sized acoustic element;
- an inwardly directed flange provided at one end of the cylindrical portion, which is formed of an annular rubber-like elastic member adapted to be engaged with the holed surface of the small-sized acoustic element;
- a groove-shaped sound hole provided at the one end of the cylindrical portion, whose one end is open in an inner peripheral surface of the inwardly directed flange and whose other end is open in an outer peripheral surface of the cylindrical portion, thus communicating with both the holed surface of the small-sized acoustic element and the side-surface sound hole of the casing.

In the holder of the present invention, the small-sized acoustic element is held within the casing of the portable communication apparatus, with the holed surface of the small-sized acoustic element for introducing or emitting sound facing the back surface of either the front surface or the rear surface of the casing. Thus, there is no need to increase the thickness of the portable communication apparatus. In the holder of the present invention, there are formed, at one end of the cylindrical portion holding the outer peripheral surface of the small-sized acoustic element, an inwardly directed flange formed of an annular rubber-like elastic member and adapted to be engaged with the holed surface of the small-sized acoustic element, and a groove-shaped sound hole whose one end is open in the inner peripheral surface of the inwardly directed flange and whose other end is open in the outer peripheral surface of the cylindrical portion. The groove-shaped sound hole communicates with both the holed surface of the small-sized acoustic element and the side-surface sound hole of the casing. Thus, it is possible to form a side-surface sound hole in the casing, making it possible to prevent the user from inadvertently clogging the sound hole with his cheek or chin. Further, despite the formation of this side-surface sound hole, the groove-shaped sound hole, constituting the sound transmission path from the side-surface sound hole to the holed surface of the small-sized acoustic element, is not intercepted by the cylindrical portion or the inwardly directed flange. Thus, it is possible to improve the small-sized acoustic element in terms of sensitivity in sound reception and the quality of the sound it emits.

In the holder for a small-sized acoustic element according to the present invention, the groove-shaped sound hole is formed such that a hole axis thereof is matched with a hole axis of the side-surface sound hole.

As a result of matching the hole axis of the groove-shaped sound hole with the hole axis of the side-surface sound hole, it is possible to form the sound reception path from the side-surface sound hole to the holed surface (sound receiving surface) of the small-sized acoustic element in a linear shape, whereby the small-sized acoustic element is improved in terms of sound reception sensitivity. Further, the sound emission path from the holed surface (sound emission surface) of the small-sized acoustic element to the sound-hole in the side surface of the casing can be formed in a linear shape, whereby the small-sized acoustic element is improved in terms of the quality of the sound it emits.

In the holder for a small-sized acoustic element according to the present invention, there are formed on the outer peripheral surface of the cylindrical portion a plurality of positioning protrusions at different circumferential intervals.

As a result of a difference in the circumferential intervals between the adjacent positioning protrusions, it is possible for the holder to be easily mounted at a proper mounting angle; further, there is no fear of the holder in the mounted state rotating circumferentially to cause positional deviation.

Further, in order to achieve the above mentioned object, according to the present invention, there is provided a mounting structure for a holder, characterized in that:

- a side-surface sound hole is provided in a side surface of a casing of a portable communication apparatus having in a front surface thereof at least one of an input operation section and a display screen;
- the holder is equipped with a cylindrical portion for holding an outer peripheral surface of a small-sized acoustic element, an inwardly directed flange provided at one end of the cylindrical portion, which is formed of an annular rubber-like elastic member and adapted to be-engaged with a holed surface of the small-sized acoustic element held by the cylindrical portion, and a groove-shaped sound hole provided at the one end of the cylindrical portion, whose one end is open in an inner peripheral surface of the inwardly directed flange and whose other end is open in an outer peripheral surface of the cylindrical portion; and
- the opening at the other end of the groove-shaped sound hole is matched with the side-surface sound hole of the casing while bringing the inwardly directed flange of the holder into elastic contact with a back side of one of the front surface and the rear surface of the casing to thereby form an acoustic space expanding in a planar direction of the back side of the casing from the side-surface sound hole of the casing, the space being formed by the back side of the casing, the holed surface of the small-sized acoustic element, the hole surface of the groove-shaped sound hole of the holder, and the inner peripheral surface of the inwardly directed flange.

This mounting structure for a holder makes it possible to attain the effects of the holder of the present invention as mentioned above. Further, the back surface of the casing, the holed surface of the small-sized acoustic element, the hole surface of the groove-shaped sound hole of the holder, and the inner peripheral surface of the inwardly directed flange form an acoustic space expanding from the side-surface sound hole of the casing in the planar direction of the back surface of the casing. Thus, the acoustic space, constituting the sound transmission path from the side-surface sound hole of the casing to the holed surface of the small-sized acoustic element, is not intercepted by the cylindrical portion of the holder or the inwardly directed flange; further, the inwardly directed flange, which is formed of a rubber-like elastic member, comes into elastic contact with the back surface of the casing, which leads to a superior soundproofing performance, thereby making it possible to improve the small-sized acoustic element in terms of sound reception sensitivity and the quality of the sound it emits.

In the mounting structure for a holder according to the present invention, the side-surface sound hole of the casing and the groove-shaped sound hole of the holder are matched with each other in a straight line.

In this construction, the hole axis of the groove-shaped sound hole is substantially matched with the hole axis of the side-surface sound hole of the casing, and the sound reception path and the sound emission path can be formed in a linear configuration, thereby improving the small-sized acoustic element in terms of sound reception sensitivity and the quality of the sound it emits.

In the mounting structure for a holder according to the present invention, there are formed on the outer peripheral surface of the cylindrical portion of the holder a plurality of positioning protrusions at different circumferential intervals, and wherein there is formed on the back side of the casing a holder mounting section with an inner peripheral surface having a configuration corresponding to the outer peripheral surface of the cylindrical portion of the holder.

In this construction, the holder can be easily mounted to the holder mounting section at a proper mounting angle; further, there is no fear of the holder in the mounted state circumferentially rotating to cause positional deviation.

In the holder and the mounting structure for the same of the present invention described above, it is possible to form, on the electrode formation surface side of the small-sized acoustic element in the cylindrical portion of the holder, a connector portion for electrically connecting the device electrodes to the board electrodes. Therefore, it is possible not only to retain the small-sized acoustic element but also to electrically connect the small-sized acoustic element to the built-in circuit board of the portable communication apparatus. The connector portion may include a combination of the holder and terminal members obtained through insert molding or a conduction path in which conductive powder, granules, or linear bodies are arranged in the thickness direction by magnetic force. Further, while the holder according to the above aspects of the present invention can be generally formed as a molding of a rubber-like elastic material, such as silicone rubber or thermoplastic elastomer, it is also possible, for example, to form it as an integral molding in which the cylindrical portion is constructed of a hard resin, with the remaining portion inclusive of the inwardly directed flange constructed of a rubber-like elastic material.

The present invention is applicable to various portable communication apparatuses, such as a mobile phone, a PHS, and a transceiver. Further, the present invention is applicable to various small-sized acoustic elements, such as a microphone, a receiver, and a buzzer.

In the holder for a small-sized acoustic element and a mounting structure for a holder of the present invention, the sound hole is formed in a side surface of the casing, making it possible to mount the small-sized acoustic element without involving an increase in the thickness of the casing. Further, in order that the transmission of sound may not be intercepted by the holder, there is formed a groove-shaped sound hole constituting a sound transmission path communicating with the side-surface sound hole and the holed surface of the small-sized acoustic element, whereby it is possible to improve the small-sized acoustic element in terms of sensitivity in sound reception and the quality of the sound it emits.

The present invention is not restricted to what has been described above; the objects, advantages, features, and uses of the present invention will be more apparent from the following description with reference to the accompanying drawings. Further, it is to be understood that the present invention covers all appropriate modifications made without departing from the gist of the present invention.

BRIEF DESCRIPTION OF THE DRAWINGS

In the accompanying drawings.

DESCRIPTION OF THE PREFERRED EMBODIMENTS

Figure 1:
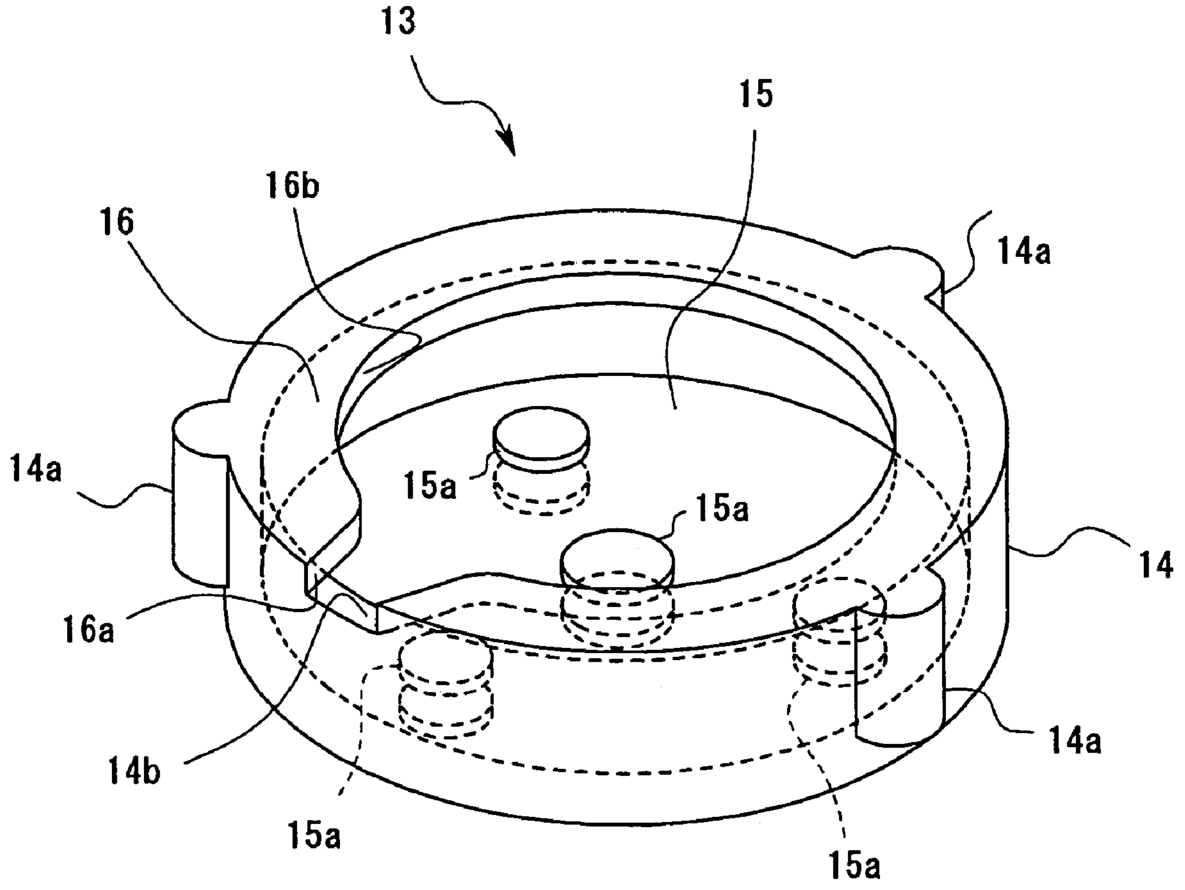
FIG. 1 is an outward perspective view of a microphone holder according to a first embodiment of the present invention.

An embodiment of the present invention will now be described with reference to the drawings. In the following description, the components that are the same as those of the prior art and the components common to the embodiments are indicated by the same reference numerals to avoid redundancy.

Figure 2:
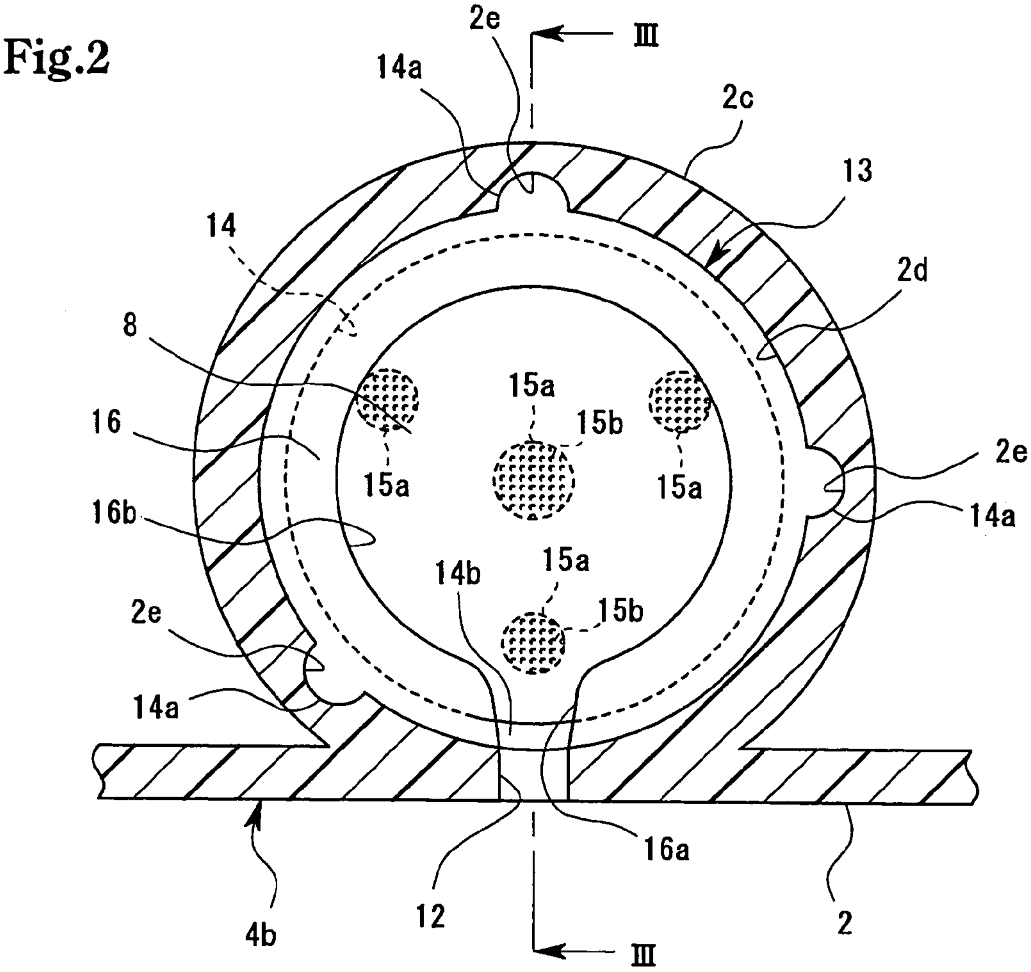
FIG. 2 is a schematic sectional view taken along the line II-II of FIG. 3, showing a mounting structure for the microphone holder of FIG. 1.
Figure 3:
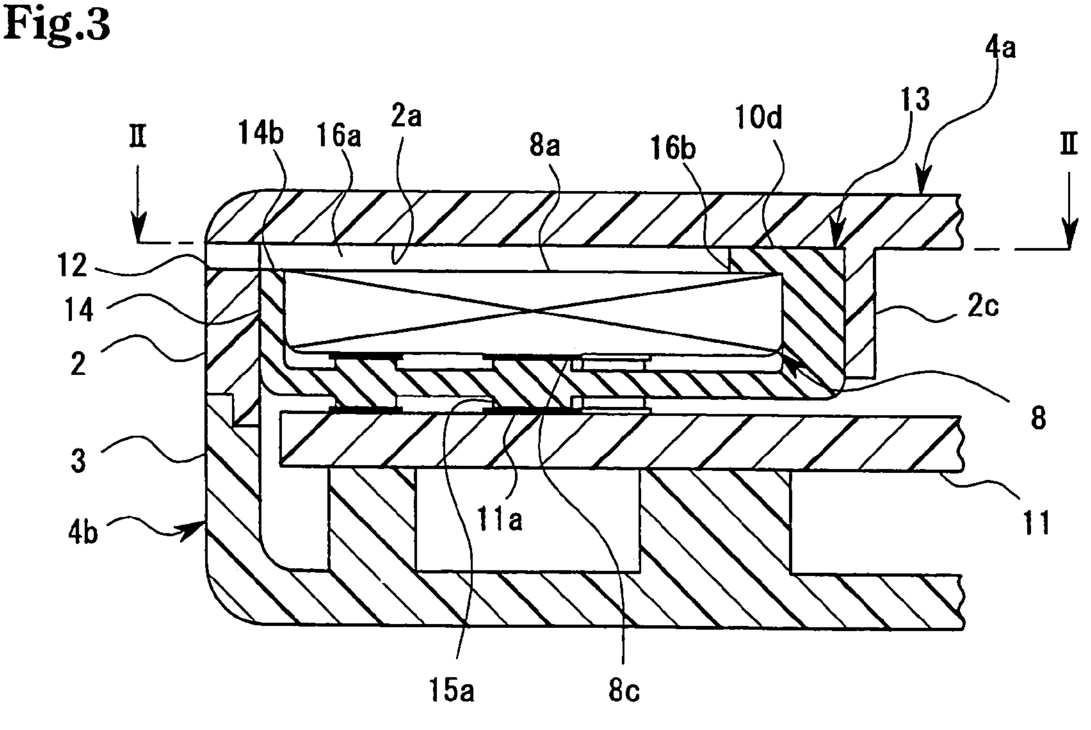
FIG. 3 is a schematic sectional view taken along the line III-III of FIG. 2, showing the mounting structure for the microphone holder of FIG. 1.

FIGS. 1 through 3 show a microphone holder 13 as a holder for a small-sized acoustic element according to the first embodiment, which is mounted to a back surface 2*a* of a front cover 2 forming a casing 4 of a mobile phone 1. The microphone holder 13 has a cylindrical portion 14, a disc-like bottom portion 15 closing one end of the cylindrical portion 14, and an inwardly directed flange 16 extending from the other end of the cylindrical portion 14 toward the axis thereof.

On the outer peripheral surface of the cylindrical portion 14, there are formed three outwardly protruding, semi-cylindrical positioning protrusions 14*a*. As shown in FIG. 2, the positioning protrusions 14*a* are formed around the axis of the cylindrical portion 14 so as to be situated at different angular intervals, that is, such that the adjacent protrusions are spaced apart from each other by different circumferential distances. In an inner peripheral surface 2*d* of a holder mounting section 2*c*, which is formed as a recess in the back surface 2*a* of the front cover 2, there are formed, in correspondence with the positioning protrusions 14*a*, recesses 2*e* to be engaged therewith. Thus, it is possible to mount the microphone holder 13 at a proper mounting angle.

Formed in the bottom portion 15 are four elastic connector portions 15*a* in the form of columns protruding from the front and back sides thereof. Formed in each elastic connector portion 15*a* is a conduction path 15*b* with a conductive medium arranged along the direction of the axis of the cylindrical portion 14. The electrodes 8*c* of the microphone 8 accommodated in the microphone holder 13 are electrically connected to the board electrodes 10*a* through the conduction paths 15*b*.

As the conductive medium in this embodiment, one with low electrical resistance is employed taking into consideration the characteristics of the microphone 8. Preferably, the conductive medium includes powder, fibers, thin lines, etc. of carbon, metal, etc. having a contact resistance of not more than 1 Ω. More specifically, it is possible to use powder or thin lines of a metal with low resistance value, such as gold, silver, platinum, copper, iron, aluminum, nickel, palladium, cobalt, or chromium or an alloy such as stainless steel. Alternatively, metal-composite powder, thin lines or the like can be resin, ceramics or the like whose surfaces are coated with metal may be used. In particular, it is desirable to employ a magnetic conductor such as a magnetic metal or magnetic metal composite in the form of granules as the conductive medium. As this magnetic conductor, it is possible to employ nickel, cobalt, iron, or an alloy containing the same; apart from this, it is also possible to employ a material fabricated of a metal with good conductivity plated with a magnetic conductor, or, conversely, a material fabricated of a magnetic conductor plated with a metal with good conductivity. In this embodiment, nickel particles are employed as the conductive medium (magnetic conductor).

The inwardly directed flange 16is the portion to be engaged with the outer edge of the sound receiving surface 8*a* of the accommodated microphone 8 so as to retain the same.

The cylindrical portion 14 has a step portion 14*b* lower than the upper end of the cylindrical portion by the wall thickness of the inwardly directed flange 16 as measured in the height direction along the cylinder axis direction. And, the inwardly directed flange 16 has an opening 16*a* formed by cutting the flange portion in the radial direction of the cylindrical portion 14 in correspondence with the step portion 14*b*. In the microphone holder 13 of this embodiment, the step portion 14*b* and the opening 16*a* form a groove-shaped sound hole whose one end is open in the outer peripheral surface of the cylindrical portion 14 and whose other end is open in the inner peripheral surface 16*b* of the inwardly directed flange 16.

The microphone holder 13 of this embodiment is formed as a molding using silicone rubber that is superior in electrical insulation and weatherability, as the rubber-like elastic material. Examples of the other rubber-like elastic material that can be used include natural rubber, isoprene rubber, butadiene rubber, 1,2-polybutadiene, styrene-butadiene rubber, chloroprene rubber, nitrile rubber, butyl rubber, ethylene propylene rubber, chlorosulfonated polyethylene, acrylic rubber, epichlorohydrin rubber, fluoro rubber, urethane rubber, styrene-type thermoplastic elastomer, olefin-type thermoplastic elastomer, ester-type thermoplastic elastomer, urethane-type thermoplastic elastomer, amide-type thermoplastic elastomer, vinyl-chloride-type thermoplastic elastomer, fluoride type thermoplastic elastomer, and ion-cross-link-type thermoplastic elastomer.

To produce the microphone holder, a liquid uncured high polymer (silicone rubber in this embodiment) mixed with a magnetic conductor (nickel particles in this embodiment) is poured into a mold for molding the holder. Then, a magnetic force along the axial direction of the cylindrical elastic connector portions 15*a* is imparted to the portions where the connector portions 15*a* are to be formed to effect magnetic field orientation of the magnetic conductor to thereby specify the conduction paths 15*b* formed by the magnetic conductor. Subsequently, in this state, the liquid uncured high polymer is cured. As described above, the microphone holder 13 of this embodiment allows integral formation of the whole, including the elastic connector portions 15*a* with the conduction paths 15*b*, by one molding process, thereby realizing efficient production.

Next, the mounting structure for the microphone 8 will be described. When the microphone 8 is accommodated in the microphone holder 13, the inwardly directed flange 16 is caught by the outer edge of the sound receiving surface 8*a* of the microphone 8, making it possible for the microphone 8 to be retained reliably. As shown in FIGS. 2 and 3, in this state, the microphone holder 13 is inserted into the holder mounting section 2*c* provided in the back surface 2*a* of the front cover 2 while mating the positioning protrusions 14*a* with the recesses 2*e*. Then, when the front cover 2 and the rear cover 3 are fixed together by screws, the microphone holder 13 is sandwiched between the printed circuit board 11 and the back surface 2*a* of the front cover 2 while being compressed by both, thus realizing a reliable mounting.

The microphone 8 thus mounted is urged toward the printed circuit board 11 by the elastic force of the inwardly directed flange 16, and the electrodes 8*c* are brought into press contact with the elastic connector portions 15*a*, which, in turn, are brought into press contact with the board electrodes 11*a*, thereby achieving reliable electrical contact.

Further, the entire surface of the inwardly directed flange 16 is brought into elastic contact with the back surface 2*a* of the front cover 2 while being kept in conformity therewith. In this way, there is formed an acoustic space with no gap, covered by the inner peripheral surface 16*b* of the inwardly directed flange 16, the back surface 2*a* of the front cover 2, and the sound receiving surface 8*a* of the microphone 8, thereby eliminating sound leakage from the periphery of the sound receiving surface 8*a*.

And, the groove-shaped sound hole formed by the step portion 14*b* of the cylindrical portion 14 of the microphone holder 13 and the opening 16*a* of the inwardly directed flange 16 constitute a tunnel-like acoustic space without coming into contact with the back surface 2*a* of the front cover 2, and is matched and communicates with the microphone hole 12 as the "side-surface hole" formed in the bottom surface 4*b* of the casing 2. Thus, it is possible to introduce voice from the bottom surface 4*b* of the casing 4 without involving an increase in the thickness of the casing 4 of the mobile phone 1; further, there is no fear of the cheek or chin of the user clogging the microphone hole 12.

Further, since the hole axis of the groove-shaped sound hole is matched with that of the microphone hole 12 in the bottom surface 4*b* of the casing 4, the groove-shaped sound hole can be formed in a straight line, so that the voice entering through the microphone hole 12 can reach the acoustic space where the sound receiving surface 8*a* of the microphone 8 is exposed without being hindered or bent by the cylindrical portion 14 and the inwardly directed flange 16. Thus, it is possible to realize a structure where the sound reception sensitivity of the microphone 8 is improved.

Figure 4:
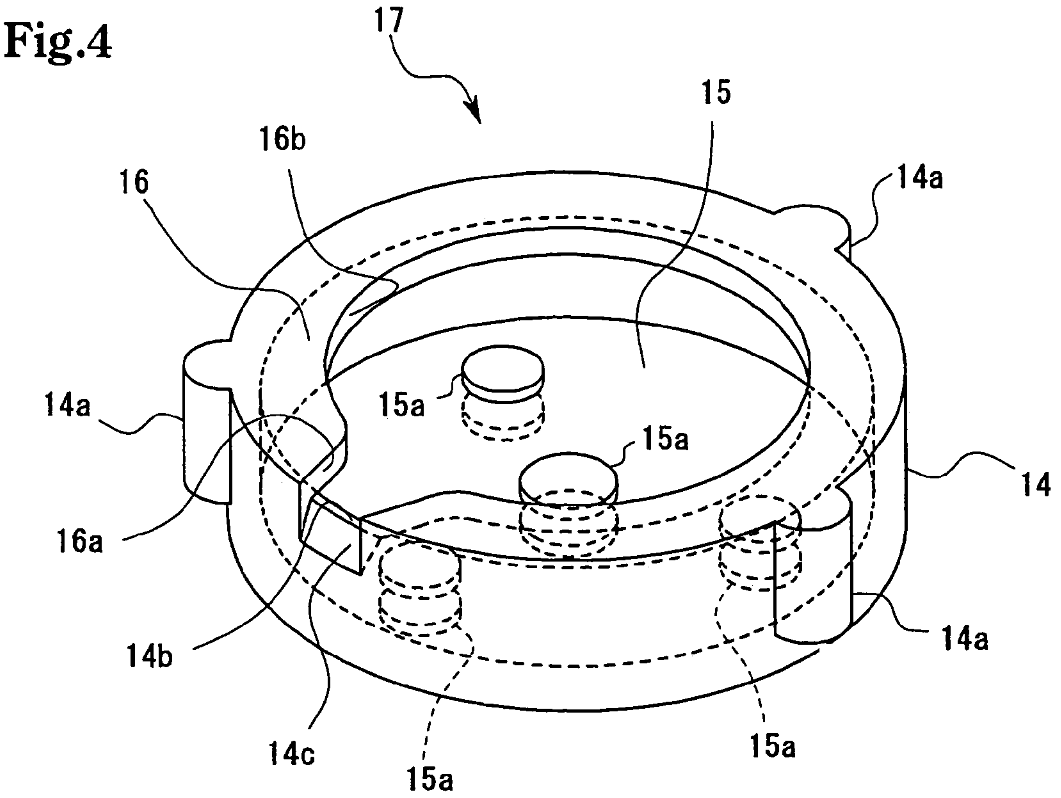
FIG. 4 is an outward perspective view of a microphone holder according to a second embodiment of the present invention.

FIG. 4 shows a microphone holder 17 according to the second embodiment. The microphone holder 17 differs from the microphone holder 13 of the first embodiment in that the cylindrical portion 14 has a beveled surface portion 14*c* extending upwards from the middle portion of the cylindrical portion with respect to the height direction thereof so as to gradually decrease in wall thickness, with the beveled surface portion 14*c* forming a part of groove-shaped sound hole.

Figure 5:
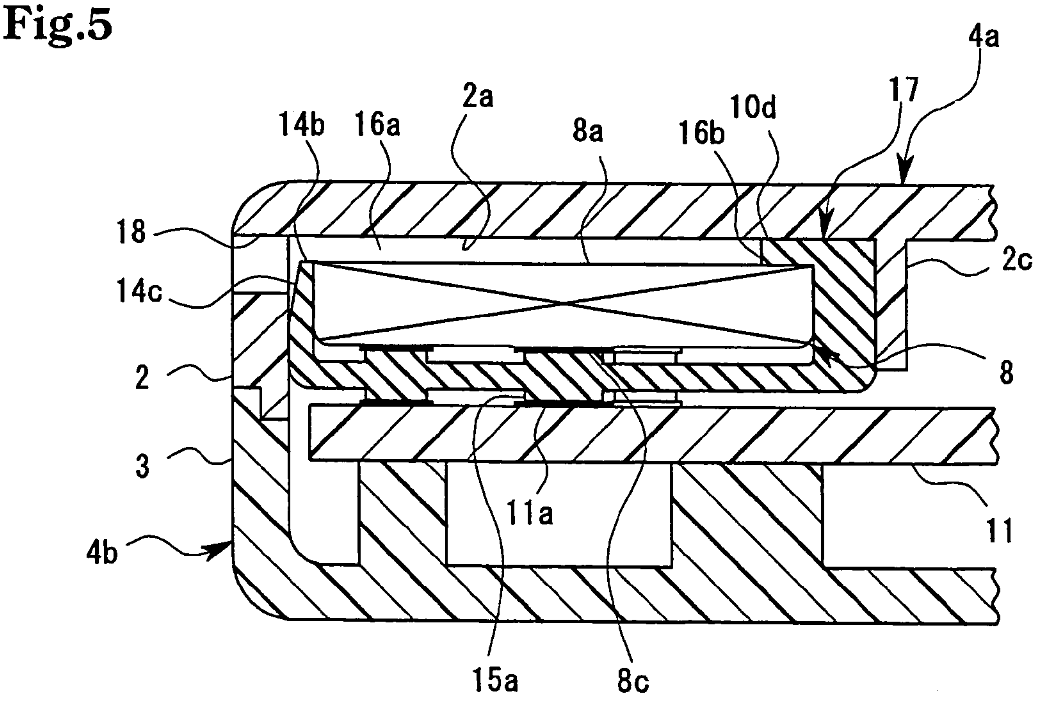
FIG. 5 is a schematic sectional view corresponding to FIG. 3, showing a mounting structure for the microphone holder of FIG. 4.
Figure 6:
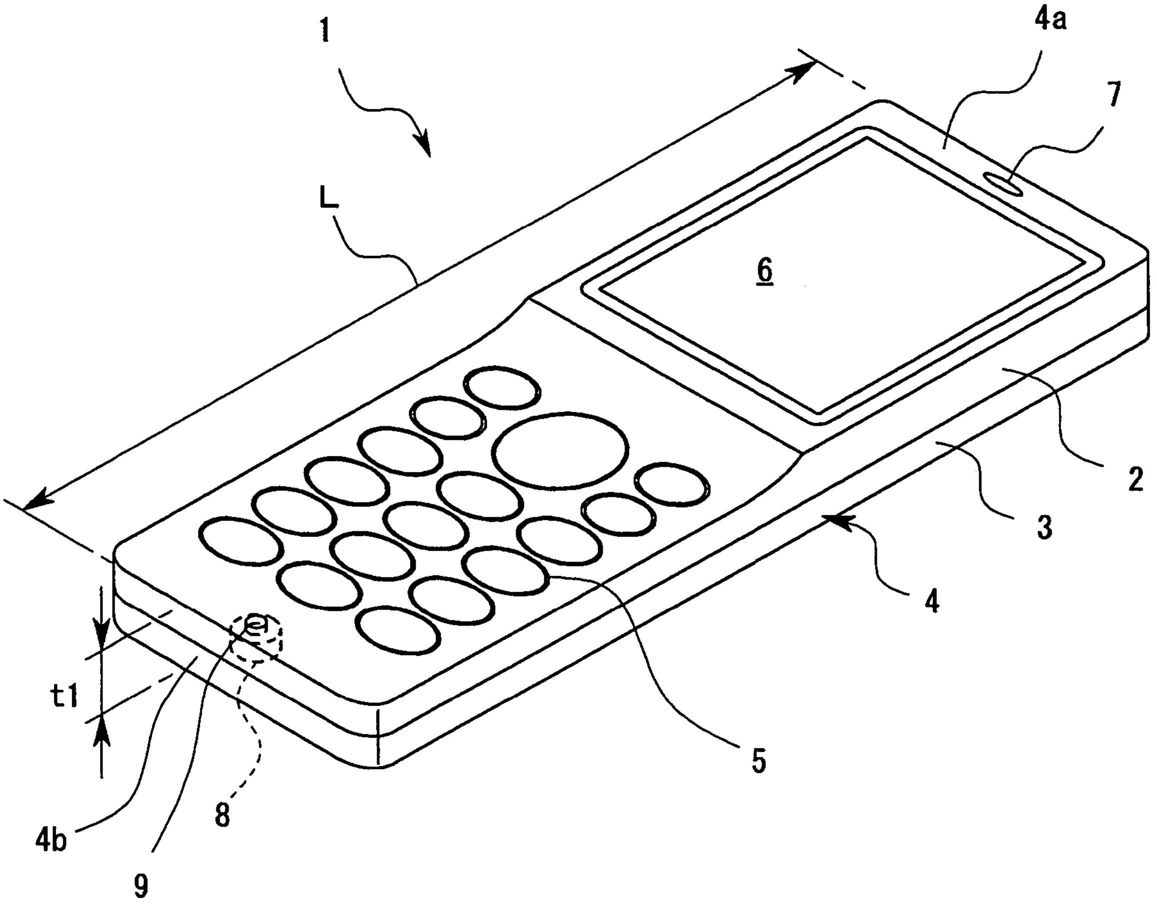
Fig.6 (Prior Art)
FIG. 6 is an outward perspective view of a conventional mobile phone.
Figure 7:
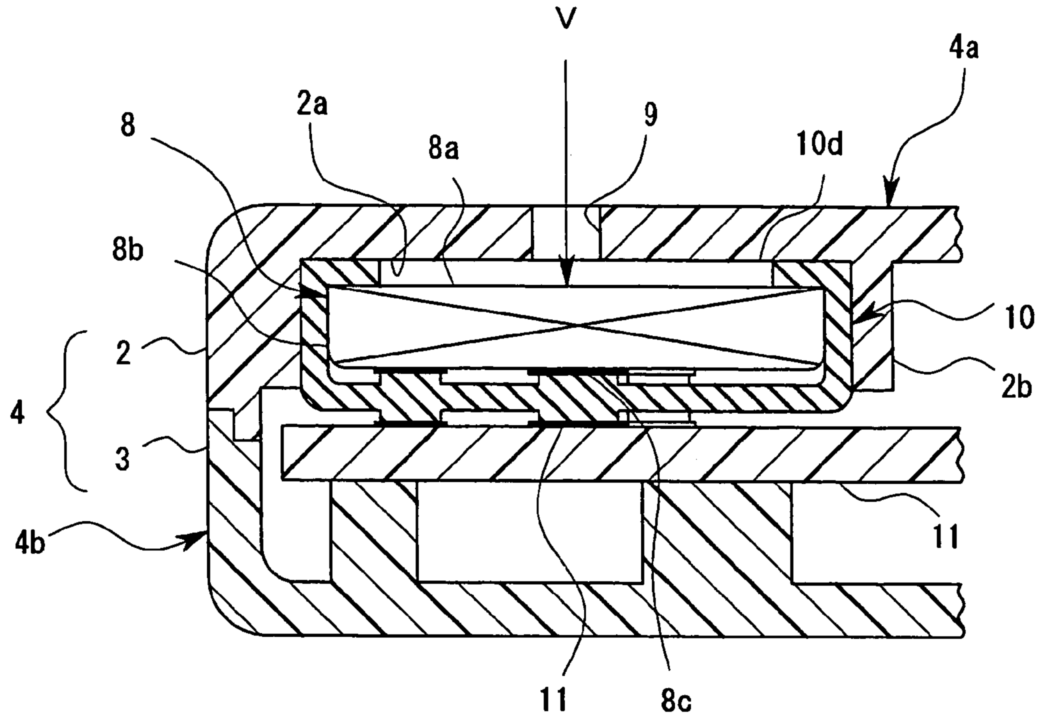
Fig.7 (Prior Art)
FIG. 7 is a schematic sectional view showing a mounting structure for a microphone holder contained in the mobile phone of FIG. 6.
Figure 8:
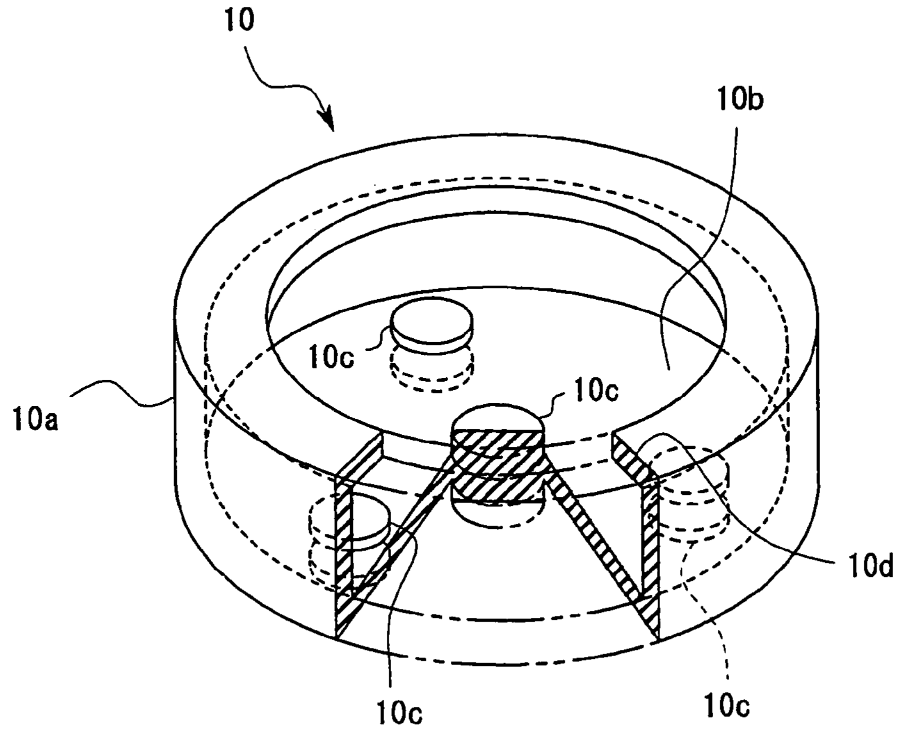
Fig.8 (Prior Art)
FIG. 8 is an outward perspective view, partly in section, of the conventional microphone holder of FIGS. 6 and 7.
Figure 9:
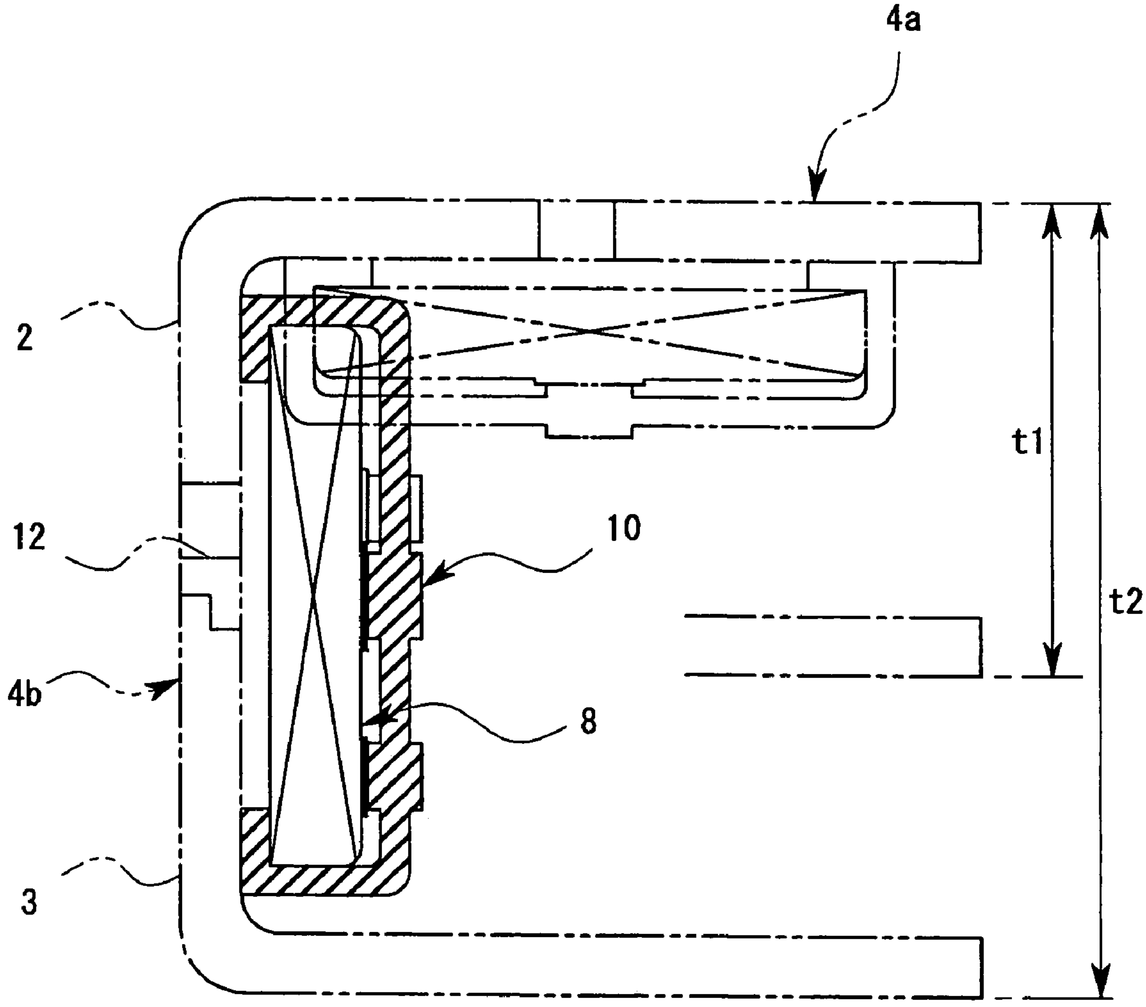
Fig.9 (Prior Art)
FIG. 9 is a sectional view schematically showing a modification of the mounting structure for a microphone holder of FIG. 7.

FIG. 5 shows how this microphone holder 17 is mounted. In this embodiment, the bottom surface 4*b* of the casing 4 has a microphone hole 18 larger than the hole 12 of the first embodiment. However, in the microphone holder 17 of this embodiment, because the beveled surface portion 14*c* is formed as a part of the groove-shaped sound hole, the microphone hole 18 of the casing 4 is not blocked from inside. Thus, it is possible to enlarge the sound introduction hole. while maintaining a linear sound reception path free from twists and turns. Such a construction is applicable to cases in which there is a difference in microphone hole size according to the type of the mobile phone 1 or in which a plurality of small microphone holes are scattered, thus achieving an improvement in general versatility in use.

While in the above-described embodiments the microphone holder 13, 17 and the mounting structure for the microphone holder 13, 17 are applied to the mobile phone 1 as the portable communication apparatus, they are also applicable in a similar fashion to a PHS or a transceiver. Further, they are also applicable to a portable communication terminal with a conversation function like a PDA. While holders for the microphone 8 are described as examples in the above-described embodiments, the present invention is also applicable to holders for various small-sized acoustic elements, such as receivers and buzzers. Further, while in the above-described embodiments the holder mounting section 2*c* is formed in the front cover 2, it may also be formed in the rear cover 3.

What is claimed is:

1. A holder for a small-sized acoustic element, which holds the small-sized acoustic element inside a casing of a portable communication apparatus, with a holed surface of the small-sized acoustic element for introducing or emitting sound being opposed to a back side of a front surface or a rear surface of the casing of the portable communication apparatus, the portable communication apparatus having at least one of an input operation section and a display screen in the front surface and having a side-surface sound hole in a side surface adjacent to the front surface, the holder for the small-sized acoustic element comprising:

a cylindrical portion for holding an outer peripheral surface of the small-sized acoustic element;

elastic connector portions provided at one end of the cylindrical portion, which conductively contact the board electrodes;

an inwardly directed flange provided at an other end of the cylindrical portion, which is formed of an annular rubber-like elastic member adapted to be engaged with the holed surface of the small-sized acoustic element;

a groove-shaped sound hole provided at an inside end of the cylindrical portion, whose one end is open in an inner peripheral surface of the inwardly directed flange and whose an outside end is open in an outer peripheral surface of the cylindrical portion, thus communicating with both the holed surface of the small-sized acoustic element and the side-surface sound hole of the casing.

2. A holder of a small-sized acoustic element according to claim 1, wherein a step portion is provided in a part of the cylindrical portion, which is lower than the upper end of the cylindrical portion by the wall thickness of the inwardly directed flange, and wherein there is formed an opening in the inwardly directed flange by cutting the flange along the radial direction of the cylindrical portion in correspondence with the step portion.

3. A holder of a small-sized acoustic element according to claim 1, wherein the groove-shaped sound hole is formed such that a hole axis thereof is matched with a hole axis of the side-surface sound hole of the casing.

4. A holder of a small-sized acoustic element according to claim 1, wherein the cylindrical portion has a beveled portion extending upwards from the middle portion with respect to the height direction thereof so as to gradually decrease in wall thickness, thus forming a part of the groove-shaped sound hole.

5. A holder for a small-sized acoustic element according to claim 1, wherein there are formed on the outer peripheral surface of the cylindrical portion a plurality of positioning protrusions at different circumferential intervals.

6. A holder for a small-sized acoustic element according to claim 1, wherein three positioning protrusions are formed on the outer peripheral surface of the cylindrical portion, and wherein, of the three circumferential intervals between the positioning protrusions, two are the same and the remaining one is different.

7. A holder for a small-sized acoustic element according to claim 1, wherein the portable communication apparatus is one selected from the group consisting of a mobile phone, a PHS, and a transceiver, and wherein the small-sized acoustic element is one selected from the group consisting of a microphone, a receiver, and a buzzer.

8. A mounting structure for a holder, characterized in that a side-surface sound hole is provided in a side surface of a casing of a portable communication apparatus having in a front surface thereof at least one of an input operation section and a display screen;

the holder is equipped with a cylindrical portion for holding an outer peripheral surface of a small-sized acoustic element, an inwardly directed flange provided at one end of the cylindrical portion, which is formed of an annular rubber-like elastic member and adapted to be engaged with a holed surface of the small-sized acoustic element held by the cylindrical portion, and a groove-shaped sound hole provided at the one end of the cylindrical portion, whose one end is open in an inner peripheral surface of the inwardly directed flange and whose other end is open in an outer peripheral surface of the cylindrical portion; and the opening at the other end of the groove-shaped sound hole is matched with the side-surface sound hole of the casing while bringing the inwardly directed flange of the holder into elastic contact with a back side of one of the front surface and the rear surface of the casing to thereby form an acoustic space expanding in a planar direction of the back side of the casing from the side-surface sound hole of the casing, the space being formed by the back side of the casing, the holed surface of the small-sized acoustic element, the hole surface of the groove-shaped sound hole of the holder, and the inner peripheral surface of the inwardly directed flange.

9. A mounting structure for a holder according to claim 8, wherein the holder has in a part of the cylindrical portion a step portion lower than the upper end of the cylindrical portion by the wall thickness of the inwardly directed flange, and wherein there is formed an opening by cutting the inwardly directed flange along the radial direction of the cylindrical portion in correspondence with the step portion.

10. A mounting structure for a holder according to claim 8, wherein the side-surface sound hole of the casing and the groove-shaped sound hole of the holder are matched with each other in a straight line.

11. A mounting structure for a holder according to claim 8, wherein the cylindrical portion has a beveled portion extending upwards from the middle portion with respect to the height direction thereof so as to gradually decrease in wall thickness, with the beveled portion constituting a part of the groove-shaped sound hole.

12. A mounting structure for a holder according to claim 8, wherein there are formed on the outer peripheral surface of the cylindrical portion of the holder a plurality of positioning protrusions at different circumferential intervals, and wherein there is formed on the back side of the casing a holder mounting section with an inner peripheral surface having a configuration corresponding to the outer peripheral surface of the cylindrical portion of the holder.

13. A mounting structure for a holder according to claim 8, wherein there is adopted a holder having three positioning protrusions on the outer peripheral surface of its cylindrical portion, wherein of the three circumferential intervals between the positioning protrusions, two are the same and the remaining one is different, and wherein there is formed on the back side of the casing a holder mounting section with an inner peripheral surface having a configuration corresponding to the outer peripheral surface of the cylindrical portion of the holder.

14. A mounting structure for a holder according to claim 8, wherein the portable communication apparatus is one selected from the group consisting of a mobile phone, a PHS, and a transceiver, and wherein the small-sized acoustic element is one selected from the group consisting of a microphone, a receiver, and a buzzer.

* * * * *